June 7, 1949.  G. C. SMITH  2,472,349
REVERSIBLE SEAT
Filed June 21, 1945   3 Sheets-Sheet 1
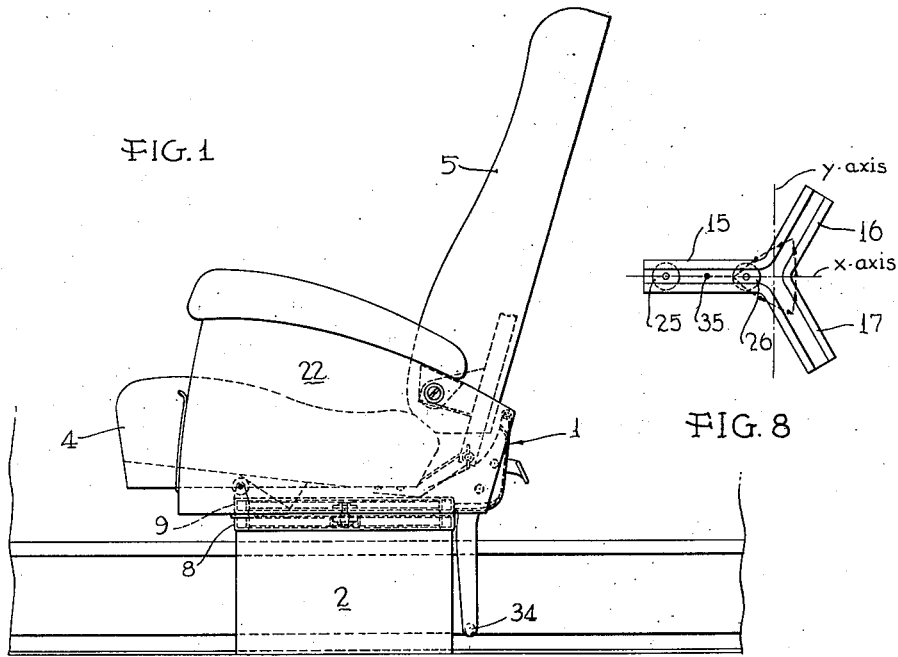
FIG. 1
FIG. 8
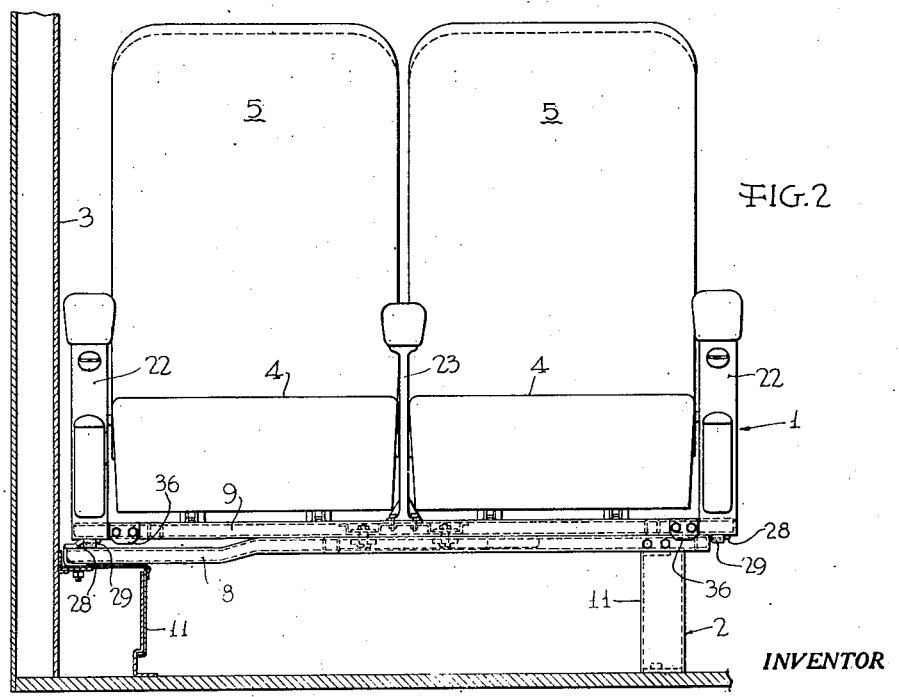
FIG. 2
INVENTOR
George C. Smith.
BY Donald B. Waite
ATTORNEY

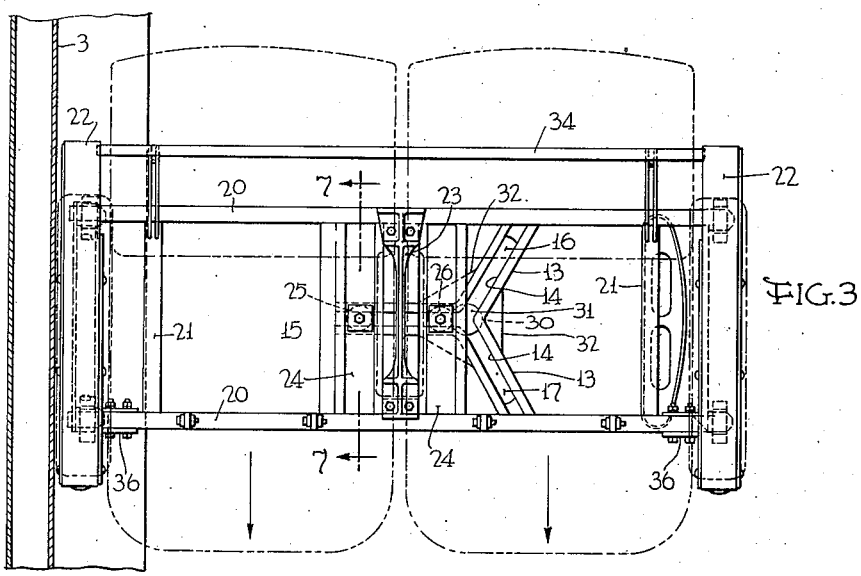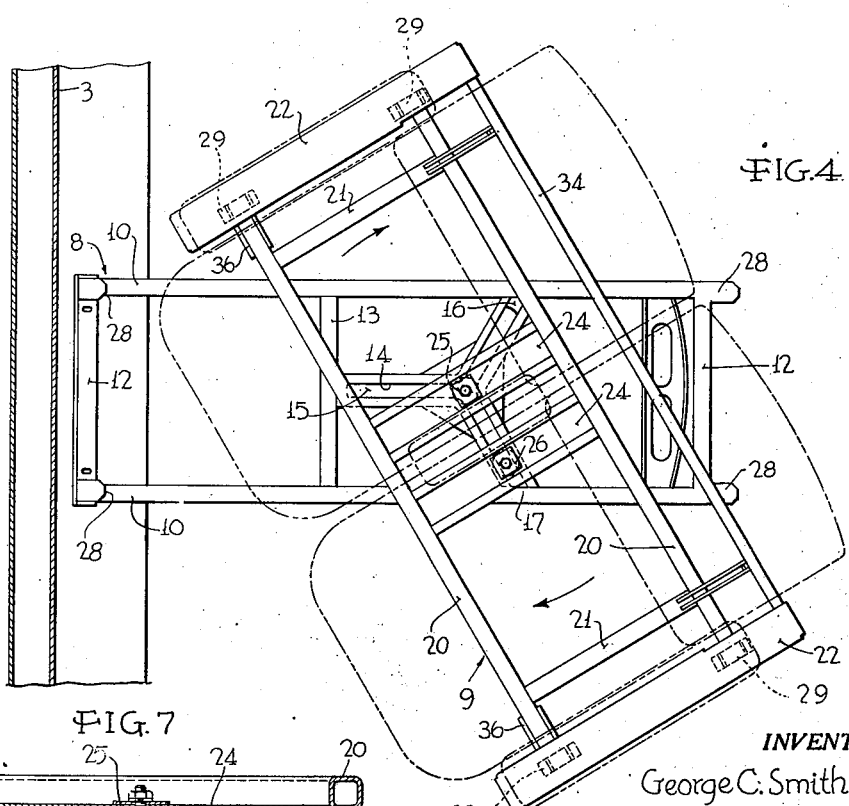

June 7, 1949.  G. C. SMITH  2,472,349
REVERSIBLE SEAT
Filed June 21, 1945  3 Sheets-Sheet 3

INVENTOR
George C. Smith
BY Donald B. Waite
ATTORNEY

Patented June 7, 1949

2,472,349

UNITED STATES PATENT OFFICE 2,472,349

REVERSIBLE SEAT

George C. Smith, Glenside, Pa., assignor, by mesne assignments, to Heywood-Wakefield Company, Gardner, Mass., a corporation of Massachusetts Application June 21, 1945, Serial No. 600,749

7 Claims. (Cl. 155—96)

This invention relates to reversible seats, especially such as are adapted for railway car use, and has for an object the provision of improvements in this art.

One of the particular objects of the invention is to provide turning mechanism of a very simple form.

Another object is to provide improved locking means for the seat.

Another object is to provide means for holding the seat frame tightly and securely on its base frame in its locked positions.

The above and other objects of the invention will be apparent from the following description of an exemplary embodiment, reference being made to the accompanying drawings, wherein:

Fig. 1 is a side elevation of a seat embodying the invention;

Fig. 2 is a front elevation;

Fig. 3 is a plan view below the seat cushions showing the turning mechanism;

Fig. 4 is a view similar to Fig. 3 with the seat in a partly turned position;

Fig. 7 is a transverse vertical section taken on the line 7—7 of Fig. 3; and

Fig. 8 is a diagram showing the movement of the center of the seat relative to the track.

Figure 5:
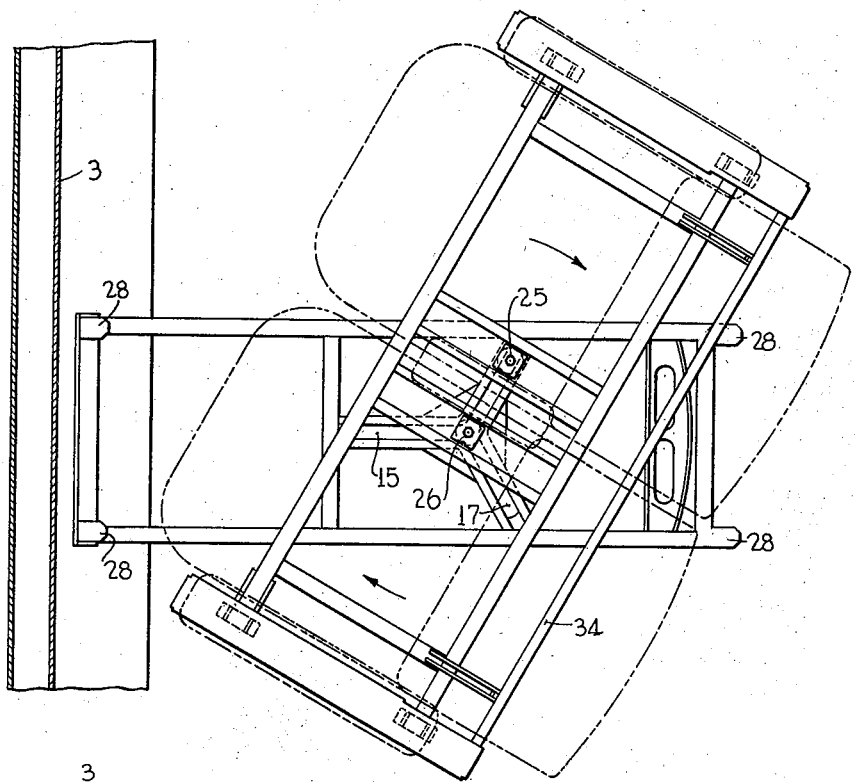
Fig. 5 is a view similar to Fig. 3 with the seat in a further turned position.
Figure 6:
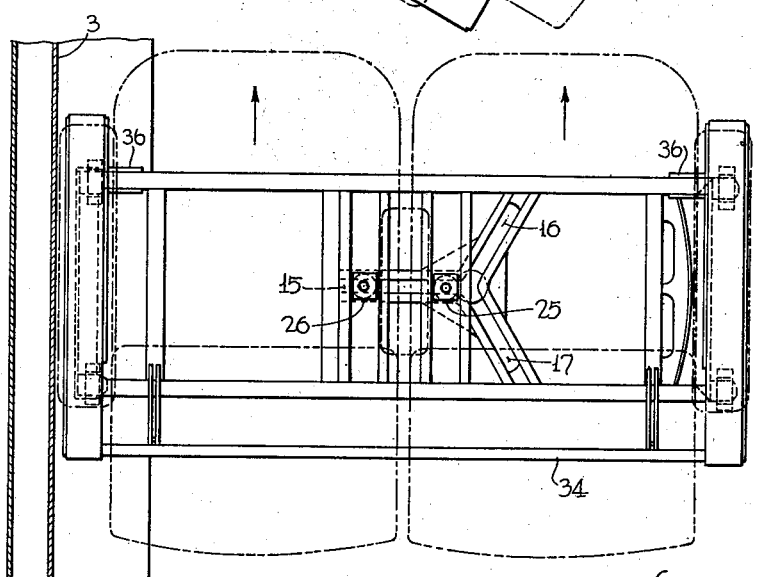
Fig. 6 is a view similar to Fig. 3 showing the seat in fully turned position.

As shown in the drawings, a seat 1 is turnably mounted on a base 2 adjacent the side 3 of a car. The seat includes one or more cushions or bottoms 4 and one or more adjustable backs 5. It is well known in this art that the seat must have a planned movement to clear the side wall of the car and adjacent seats in turning. This movement includes a first motion in a direction away from the side wall of the car, then a motion generally parallel to the side wall and away from the next rearward seat, then a motion away from the next forward seat, then finally a motion in a direction toward the side wall. The present mechanism in a very simple form provides this movement. It is provided between a base frame 8 and a seat frame 9 which have horizontal turning movement relative to each other.

The base frame 8 includes side rails or bars 10 supported on end pedestals 11, transverse members 12, and members 13 providing guide tracks 14. The track 14 is of generally Y shape with the stem 15 of the Y disposed approximately perpendicular to the side wall of the car and the branches 16 and 17 diverging laterally from the stem.

The seat frame 9 includes side rails or bars 20, cross members 21, end arm rest structures 22, a center arm rest structure 23, and a pair of spaced upwardly bowed resilient cross members 24 carrying a pair of spaced track follower elements 25, 26 in the form of anti-friction rollers adapted to fit and move in the guide track 14. The upper part of the track has edges overhanging the upper ends of the rollers to retain the two frames together with a resilient pressure between them. The facing surfaces of the base and seat frames are smooth and flat so the parts will turn without catching. In final position the seat frame side bars rest on the side bars of the base frame.

The stem of the Y-track provides lost motion of the rollers between the wall end and the junction with the branches in order that the seat may have movement perpendicular to the side wall for clearance and locking purposes. The locking means employed is of a type which engages and disengages by the endwise movement. As illustrated, the locking means comprises plugs or studs 28 on one frame and sockets or loops 29 on the other frame for engaging the plugs. Due to resilient binding between the frames and a final binding between the plugs and their sockets the seat is firmly held in its usable position, movable therefrom only by a strong jerk endwise of the seat toward the aisle.

The rollers may be inserted from below the track. If it is overhung on the lower side as well as on the upper side, an opening 30 at the junction of the three track branches may be provided for upward insertion of the rollers. Also, if desired, to restore strength lost by reason of the opening 30, this opening may later be closed by a filler plug cap 31. Gussets 32 edge-welded to the Y-frame 13 aid in providing strength.

Adjustable foot rests 34 may be provided on the back of the seat frame for the use of the occupant in the next rearward seat.

The diagrammatic views, 3 to 6, show how the rollers 25, 26 first move endwise of the track stem 15 until one, as 26, abuts the frog at the junction with the branches of the track. Then the roller 26 moves out one branch, as 17, until it is at the end and the other roller 25 is located at the junction. Then the roller 25 moves down the other branch, as 16, to the end while the roller 26 returns to the junction. Thereafter roller 26 moves up the stem 15 until the roller 25 is located at the junction. Finally the two rollers are pushed sharply along the stem 15 toward the side wall of the car until the locking means are securely engaged. Except for the initial and final endwise movement the whole action is a general rotational movement of the seat.

During this movement the center of the seat, that is a point 35 located midway between the axes of the track rollers 25, 26, describes a generally triangular figure with curved sides. This, for the track illustrated is approximately the shape of a three-point hypocycloid symmetrical about the X axis, here the axis of the track stem 15. This is a very favorable motion for clearing the adjacent obstructions.

It will be noted that during the turning action the rollers 25 and 26 have been completely reversed in the track. Inasmuch as either roller fits any part of the track there may be continuous rotation of the seat in one direction if the track stem 15 is long enough to permit the seat to be pulled far enough away from the wall. However, for small lost motion it is possible to reverse the seat by turning alternately in opposite directions. Stop plates 36 on the seat frame 9 assure by their engagement with the base frame 8 that the seat will be alternately turned in opposite directions. The plates, as shown in Fig. 2, are free to pass over the low end of the base frame adjacent the car wall.

The branches of the Y-shaped track are shown as being rectilinear but for different movements they may have different shapes. For example, they may be curved either upward or downward. The locus of movement of the seat center will be correspondingly altered.

While one embodiment of the invention has been described for purposes of illustration, it is to be understood that there may be various embodiments within the limits of the prior art and the scope of the subjoined claims.

What is claimed is:

1. Reversing mechanism for a car seat or the like, comprising in combination, a base frame, a supported frame mounted for relative turning movement thereon, a continuous guiding trackway on one of said frames, said trackway including at least three connecting portions meeting at a common junction and extending in different directions, and spaced guided track followers on the other frame mounted for turning movement in said trackway to reverse the position of the frames and in so doing to reverse their positions on said trackway, said frames being unrestrained in relative turning movements except by said trackway and track followers, whereby either of the track followers is enabled to move along any portion of said trackway at some time during the turning movement of the seat.

2. Reversing mechanism for a car seat or the like, comprising in combination, a base frame, a supported frame mounted for relative turning movement thereon, a guiding trackway on one of said frames, and guided means on the other frame adapted to follow said trackway, said trackway including a Y-shaped portion with the stem and branches of the Y-shaped trackway interconnected for passage of the guided track follower means, and the guided means including two spaced track follower elements following said trackway and reversible in the Y-shaped portion, said frames being unrestrained in relative turning movements except by said trackway and track followers, whereby either of the track followers is enabled to move along any portion of said trackway at some time during the turning movement of the seat.

3. Reversing mechanism for a car seat or the like, comprising in combination, a base frame, a supported frame mounted for relative turning movement thereon, a Y-shaped track on one of said frames, and a pair of spaced track-follower elements on the other frame operatively associated with said track so as to be reversible in position in the stem of the Y, the stem of the Y track being longer than the distance between the spaced elements, measured from the center of one of the spaced elements to the outer edge of the other spaced element, to provide free movement therein as for locking the seat.

4. Revolving mechanism for vehicle seats comprising a first structure and a second structure, a trackway on said first structure having three interconnected branches extending in different directions from a common center, a pair of track followers on said second structure running in said track at a distance from each other, measured from the center of one to the outer edge of the other, not greater than the length of any one of said branches, said structures being adapted for forming respectively a part of a seat pedestal and a revolving seat structure and the structures having free turning movement except for the trackway and track followers.

5. Revolving mechanism for vehicle seats comprising a first structure and a second structure, a trackway on said first structure having three branches extending in different directions from a common center of which two branches are of equal length and one branch is of greater length, a pair of track followers on said second structure running in said track at a distance from each other, measured from the center of one to the outer edge of the other, about equal to the length of said shorter branches, said structures being adapted for forming respectively a part of a seat pedestal and a revolving seat structure.

6. In a revolving mechanism for a seat arranged perpendicularly to a wall such as to the side wall of a railway vehicle, a pedestal structure and a seat underframe structure, a trackway on one of said structures and a pair of track followers on the other one of said structures, said trackway having three branches emanating from a common center, the first one of said branches extending from the center perpendicularly to the wall in the direction of the desired linear starting and end movement of the structures relative to each other and the two other branches extending in opposite directions from the direction of said first branch, said track followers being secured to their structure a distance from each other, measured from the center of one to the outer edge of the other, not greater than the length of any one of said branches and on a line perpendicular to said wall, the arrangement being such that with the seat facing in either direction parallel to the wall, said track followers are both in said first branch of the trackway.

7. In a revolving mechanism for a seat arranged perpendicularly to a wall such as to the side wall of a railway vehicle, a pedestal structure and a seat underframe structure, a trackway on one of said structures and a pair of track followers on the other one of said structures, said trackway having three branches emanating from a common center, the first one of said branches extending from the center perpendicularly to the wall in the direction of the desired linear starting and end movement of the structures relative to each other, the two other branches extending in opposite directions from the direction of said first branch and having a shorter length, said track followers being secured to their structure a distance from each other, measured from the center of one to the outer edge of the other, about equal to the effective length of said two shorter branches and on a line perpendicular to said wall, the arrangement being such that with the seat facing in either direction parallel to the wall, said track followers are both in said first branch of the trackway thereby preventing revolving movement of the two structures relative to each other until an initial movement of the seat underframe structure has brought one of the track followers into the center of said three branches.

GEORGE C. SMITH.

REFERENCES CITED

The following references are of record in the file of this patent:

UNITED STATES PATENTS

| Number | Name | Date |
| --- | --- | --- |
| 1,741,784 | Lucas | Dec. 31, 1929 |
| 1,937,578 | Knight | Dec. 5, 1933 |
| 2,063,674 | Hendrickson et al. | Dec. 8, 1936 |
| 2,124,501 | Willoughby | July 19, 1938 |
| 2,372,495 | Horner et al. | Mar. 27, 1945 |

FOREIGN PATENTS

| Number | Country | Date |
| --- | --- | --- |
| 5,305 | Great Britain | 1883 |